(12) United States Patent
Wu et al.

(10) Patent No.: US 12,483,736 B1
(45) Date of Patent: Nov. 25, 2025

(54) SYSTEMS AND METHODS FOR AUDIO AND VIDEO CONTENT STITCHING

(71) Applicant: Amazon Technologies, Inc., Seattle, WA (US)

(72) Inventors: Yongjun Wu, Bellevue, WA (US); Kyle Alexander Woo, Kent, WA (US); Puneet Daga, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 18/343,646

(22) Filed: Jun. 28, 2023

(51) Int. Cl.
*H04N 21/234* (2011.01)

(52) U.S. Cl.
CPC .............................. *H04N 21/23424* (2013.01)

(58) Field of Classification Search
None
See application file for complete search history.

(56) References Cited

U.S. PATENT DOCUMENTS

| 10,200,732 B1* | 2/2019 | Montgomery ....... H04N 21/633 |
| 2016/0182923 A1* | 6/2016 | Higgs ................. H04H 20/106 |
| | | 725/34 |

* cited by examiner

Primary Examiner — James R Marandi
(74) Attorney, Agent, or Firm — Eversheds Sutherland (US) LLP

(57) ABSTRACT

Systems and methods for audio and video content stitching are provided. an example method may include receiving a first video fragment and a second video fragment included within primary video content, the first video fragment and the second video fragment including one or more video frames, wherein the first video fragment is a first time duration, wherein the second video fragment is a second time duration, and wherein the first time duration and the second time duration are different. The example method may also include receiving a third video fragment associated with secondary video content. The example method may also include determining a first cue point within the primary video content, wherein the first cue point is located at a first time between a starting time of the first video fragment and a second time corresponding to a sum of the first time and a duration of the first time duration. The example method may also include adding the secondary video content to the primary video content at the first cue point. The example method may also include presenting the secondary video content at the first cue point within the primary video content.

17 Claims, 5 Drawing Sheets

SYSTEMS AND METHODS FOR AUDIO AND VIDEO CONTENT STITCHING

BACKGROUND

When secondary video and/or audio content (e.g., advertisement content) is added to primary video and/or audio content (e.g., a television show or movie being streamed by a viewer), the secondary content may need to be "stitched" (or added) within the primary content such that the secondary content is presented during the primary content. However, in some instances, the secondary content may be encoded into fragments of a time duration, such as 2 s, that limits the ability to accurately stitch the secondary content into the primary content. For example, if a scene of the primary content is 5.5 s in duration, but advertisement content can only be inserted at the 4 or 6 s location, then there may be overlap between the advertisement content and the primary content.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may depending on the context, encompass a plural number of such components or elements and vice versa.

DETAILED DESCRIPTION

Figure 1:
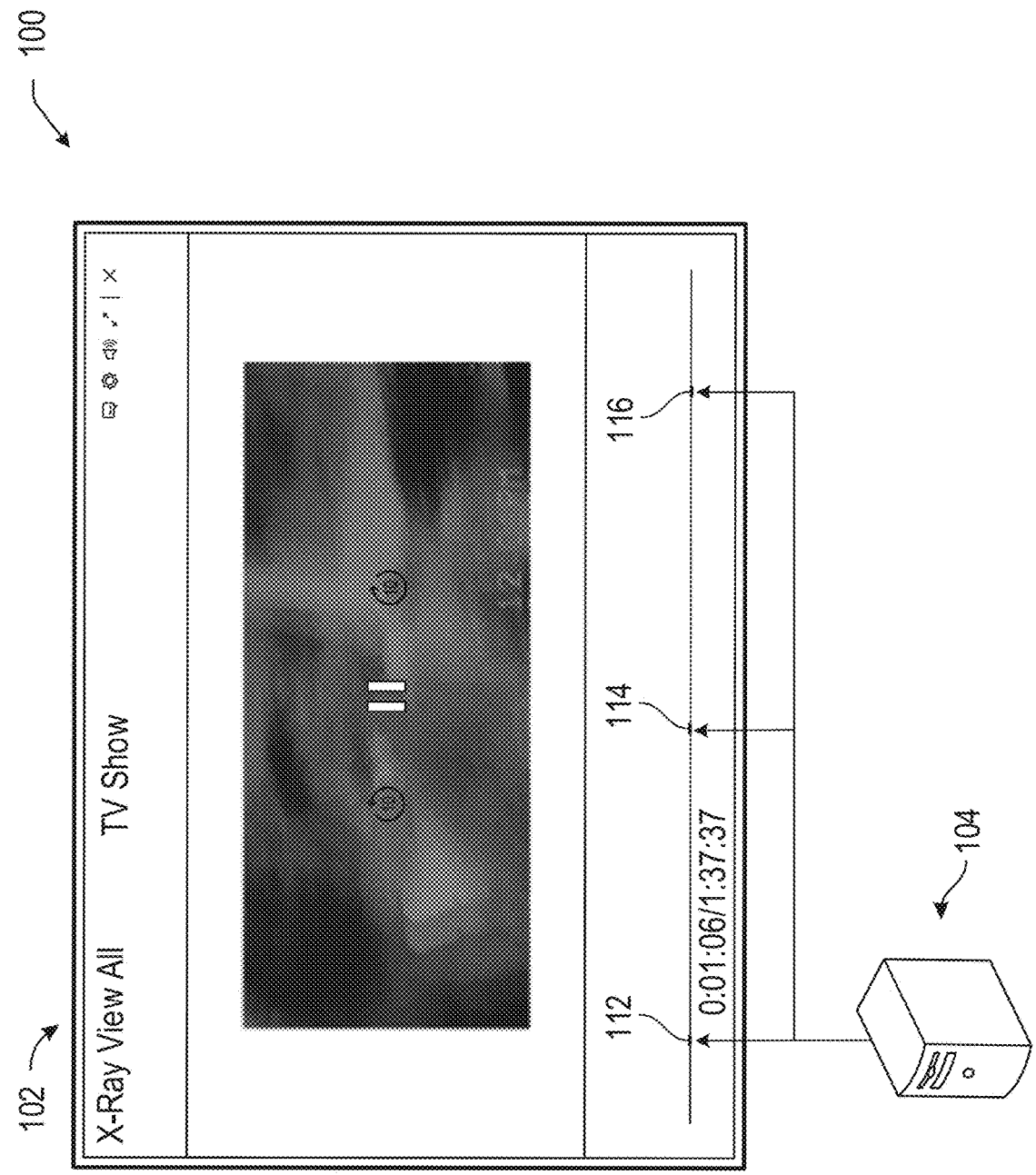
FIGS. 1-2 depicts an example use case for audio and video content stitching in accordance with one or more example embodiments of the disclosure.

This disclosure relates to, among other things, systems and methods for audio and video content stitching. That is, the method may involve determining how to "stitch" or combine secondary audio and/or video content within primary audio and/or video content. The approach described herein may allow for the secondary content to be stitched into the primary content without overlap between the primary and secondary content even if the time duration of the video and/or audio fragments included in the primary content are dynamic rather than being constant durations (for example, if cue point aware encoding (CAE) is used instead of cue point agnostic encoding for the video fragments of the secondary content).

As one example use case, the systems and methods described herein may be used to stitch advertisement content into primary video content, such as a television show or a movie (or any other type of content), being streamed to a viewer through a content platform. While reference may be made herein to advertisement content as an example use case, these systems and methods may also be applicable to any other type of secondary content that is stitched into primary content as well.

A content platform may be a service that is configured to present different types of content to a user. Content publishers may provide video, audio, and/or other types of content to the content platform and users may be able to access the content platform to view the content that is published on the platform. For example, a content publisher may provide a television show to the content platform for hosting on the content platform. The viewer (the term "user" may be used interchangeably with "viewer" herein) may then access the content platform (e.g., through an application, website, etc.), select the television show, and the television show may be streamed to the user through the content platform.

In embodiments, the content may be streamed to a viewer device using a streaming protocol such as dynamic adaptive streaming over HTTP (DASH) or HTTP live streaming (HLS). DASH is similar to HLS, in that it separates the video content into fragments and encodes the fragments at different quality levels. This makes it possible to stream videos at different quality levels and to switch between video quality levels as the video is being streamed (for example, if the internet connection of the device on which the content is being streamed is varying). Given that the video content being streamed is provided by a content publisher and the advertisement content that is presented during the video content may be provided by a separate advertisement publisher, the advertisement content may need to be "stitched" (or added) into the video content so that it may be presented during the video content as the video content is streamed by the viewer.

With DASH encoding, there are some parameters that are used to manage the media timeline for mid-roll enabled video on demand (VOD) dynamic ad insertion (DAI), which may refer to primary video and/or audio content that includes advertisement content during the primary video and/or audio content rather than at the beginning or end of the content. A first variable may include a period duration variable. The period duration variable may refer to a time duration of a period or a fragment of primary content. Currently, this period duration variable may be set based on the duration of the video stream, ignoring the duration of the audio stream in the same period (for both the primary content being streamed and the advertisement content).

In embodiments, the advertisement content may be encoded and packaged in a particular manner. That is, the video stream duration may be a constant time value (e.g., two seconds). The audio stream duration may always be repeated in a fixed pattern depending on the audio codec format. Each corresponding audio fragment may have a minimum misalignment against the corresponding video fragment, with the accumulated audio duration being longer than or equal to the video stream duration at the end of an audio fragment. That is, given an advertisement video stream duration that is equal to the period duration, the corresponding audio stream duration may be equal to or longer than the period duration.

However, this type of advertisement content encoding, which may be referred to as cue point agnostic encoding, may limit the granularity at which the advertisement content may be stitched into the primary content. For example, if a video fragment associated with a scene of a television show is 5.5 s, a 2 s duration advertisement video fragment may only be stitched into the primary content at 4 s or 6 s. Thus, the primary content and the advertisement video fragment may not be exactly aligned, which may lead to a partial overlap in the content.

Although the primary content that is being streamed may be encoded and packaged in the same (or a similar) manner as the advertisement content, and the period duration may also be equal to the video streaming duration, the audio stream duration may be shorter than, equal to, or longer than the period duration because of the cue point locations and the repeated patterns from audio codec formats. As a first example, if an advanced audio coding low complexity (AAC-LC) coding format is used, if a first advertisement break is inserted into primary content at 8 seconds and a second advertisement break is inserted into the content at 24 seconds, the primary content period between 8 and 24 seconds would have a period duration equal to the video stream duration and the audio stream duration. As a second example, if a first advertisement break is at 8 seconds and a second advertisement break is at 22 seconds, the primary content period between 8 and 22 seconds may have a period duration equal to the video stream duration but shorter than the audio stream duration by 16 ms. As a third example, If the first advertisement break is at 10 seconds and the second advertisement break is at 24 seconds, then the primary content period between 10 and 24 seconds may have a period duration equal to the video stream duration but longer than the audio stream duration in by 5.333 ms.

A second variable may be a period start variable. The period start variable may be defined as the timestamp of the start of the period defined by the period duration. The period start may in a current period may be equivalent to the period start of the previous period plus the period duration of the previous period.

A third variable may be a presentation time offset variable. The presentation time offset variable corrects an offset present in the media segments once those are decoded. An example use case is creating an on-demand media presentation description (MPD) from a subsection of already-existing content, without modifying directly the concerned segments or their URLs.

When the presentation time offset is equal to zero in the primary content or the advertisement content, the syntax may not be present. When the presentation time offset is set in the "representations" in a primary content period, the presentation time offset is set based on the time stamp of the first video frame in the first video fragment in the period. There may exist two scenarios given that the accumulated duration of audio segments may be equal to or longer than that of the same number of video segments in the primary content. First, when the previous main content ends with an accumulated duration of audio segments equal to that of the same number of video segments, the presentation time offset equals the time stamp of the first video frame in the first video segment in the period, and also the time stamp of the first audio frame in the first audio segment in the period. Second, when the previous main content ends with an accumulated duration of audio segments longer than that of the same number of video segments, the presentation time offset equals the time stamp of the first video frame in the first video segment in the period, but smaller than the time stamp of the first audio frame in the first audio segment in the period, which introduces a small gap in audio stream timeline.

In embodiments, the equation and constraint enforced by content encoding and packaging in both primary content and secondary content may be: [the accumulated duration of video segments]<=[the accumulated duration of audio segments]<[the accumulated duration of video segments+one audio frame duration].

This stitching algorithm using cue point agnostic encoding may introduce gaps in the beginning of the audio stream timeline. However, whenever there exist gaps in the beginning of the audio stream timeline, the previous primary content period may have an audio stream timeline that is longer than the ending time of the period. The amount of trailing overlap going beyond the end of the primary content period in audio streams should exactly compensate for the amount of leading gap in audio streams, which is caused by the trailing overlap or misalignment (e.g., the accumulated duration of audio segments may always be equal to or longer than that of video segments). That is, the gaps and overlapping in audio streams in main content periods should compensate for one another. However, secondary content that is inserted into the primary content may also have the accumulated duration of audio segments that is equal to or longer than that of video segments. This results in trailing overlapping extending beyond the end of the primary content period in audio streams.

To address these shortfalls of cue point agnostic encoding, cue point aware encoding (CAE) may instead be used. In cue point aware encoding, the encoding and packaging of primary content may generate video fragments that may not necessarily be constant durations. For example, rather than all the video fragments being 2 s in duration, the video fragments may range between 2 s and 5 s (or any other duration range) depending on the primary content. Additionally, the video and audio fragments may be encoded such that the accumulated duration of audio segments is always equal to or longer than that of the same number of video segments, but not by more than one audio frame duration.

In embodiments, cue points may be provided at the accuracy of millisecond (ms), and fall between two video frames, rather than being provided at the boundary of video frame, which may cause confusion about whether the video frame should belong to the scene before the cue point or after the cue point. Cue point aware encoding may partition the video frame right before the cue point in as the end of a fragment, and the video frame right after the cue point as the beginning of a fragment. During stitching, the cue point may be revised as the time stamp of the video frame right after the cue point (e.g., the beginning of the segment right after the cue point). The revision and change may be less than one video frame duration. Content encoding may validate whether fragment partition honors cue points ingested from content providers with the adjustment less than one video frame duration. Stitching may also validate whether advertisement content insertion and stitching honor cue points from advertisement content servers with the adjustment less than one video frame duration.

Figure 2:
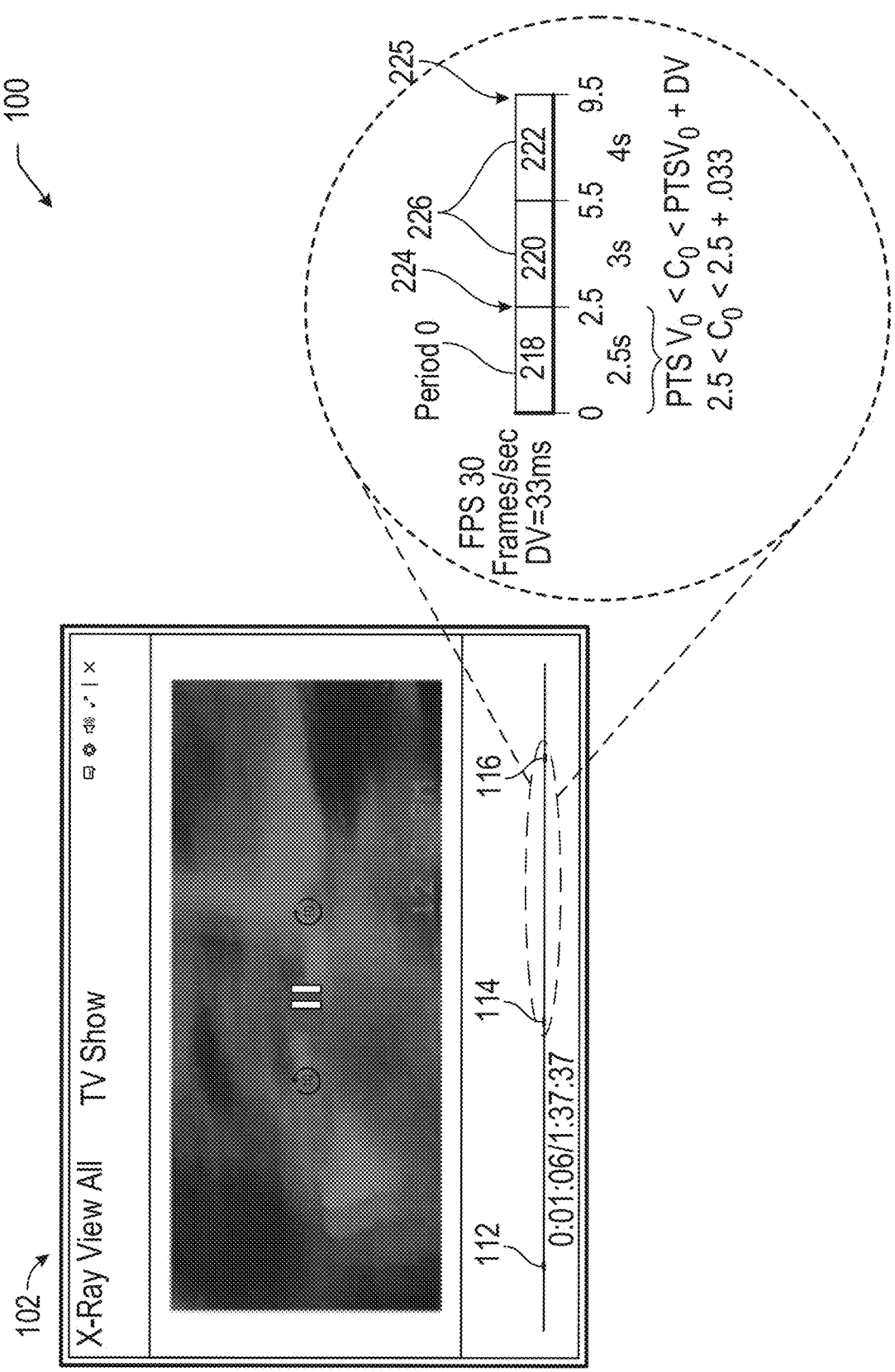

In contrast with content agnostic encoding, CAE provides added complexity in determining at which fragment boundary the video and audio fragments for the advertisement content should be added (given that the fragments may no longer be constant in duration). FIG. 2 provides a comprehensive description of the approach for stitching secondary video and/or audio content (such as advertisement content)

into primary video and/or audio content when dynamic encoding is used for the primary content.

Turning to the figures, FIG. 1 depicts an example use case 100 for audio and video content stitching. The use case 100 shows video content 102 (for example, a movie, television show, etc.) that is being streamed through a content platform to a user. Included at various time intervals throughout the video content 102 are advertisement time slots ("advertisement breaks") in which advertisement content (which may include any number of individual advertisements) is presented to the viewer. For example, the use case 102 shows time slots 112-116, however, any other number of times slots may exist within video content 102 that is streamed through the content platform. This advertisement content may be stitched into the video content 102 by a computing system 104 (such as remote system 404, etc.).

In the use case 100, the video content 102 may be presented to the viewer until one of the advertisement time slots is reached in the stream. Once one of these time slots is reached, the advertisement content that has been stitched into the video content 102 at that particular time slot may be presented to the viewer. That is, the content being streamed may transition from the video content 102 to the advertisement content. Once the advertisement content is completed, the stream may transition back to the video content 102 and the video content 102 may resume back to the point at which it transitioned into the advertisement content. For example, the video content 102 may transition into advertisement content at time slots 112, 114, and/or 116. The advertisement content presented during these time slots may either be the same advertisement content or different advertisement content.

FIG. 2 is a continuation of the use case 100 for audio and video content stitching. FIG. 2 shows an exploded view of a series of video fragments included within the video content 102 (for example, a first video fragment 218, a second video fragment 220, and a third video fragment 222). A video fragment may be an individual collection of frames, where the image fragments in combination form the video content 102 that is presented to the viewer.

As shown in the figure, the video fragments may not necessarily be constant duration. For example, the first video fragment 218 is 2.5 s in duration, the second video fragment 220 is 3 s in duration, and the third video fragment 222 is 4 s in duration.

The number of frames included within a given video fragment may depend on the duration of the video fragment as well as the frames per second (FPS) of the video content 102. As shown in the figure, the video 102 content is being presented at a frame rate of 30 FPS (e.g., 30 frames of the video content 102 are presented to the viewer every second). Thus, 75 frames would be presented during the first video fragment 218, 90 frames would be presented during the second video fragment 220, and 220 frames would be presented during the third video fragment 222. Additionally, the DV (duration of each frame) given this FPS would be 33 ms (each frame has a duration of 33 ms).

FIG. 2 also shows cue points within the series of video fragments (for example, cue point 224, which is shown as "Co," and cue point 225). The cue point 224 and cue point 225 may be locations within the series of video fragments at which advertisement content may be stitched into the video content 102 for presentation to the viewer. For example, the cue point 224 may be associated with the time slot 114 and cue point 225 may be associated with the time slot 116. The exploded view shows that between the cue point 224 and the cue point 225 may exist a portion of the video content 102 defined by a period 226 (which may be a series of video fragments) forming the video content that exists between the advertisement content presented in time slot 114 and time slot 116.

In embodiments, the location of the cue point 224 may be based on Equation 2 (described below with respect to FIG. 2). That is, the cue point 224 may be between the time stamp of the first video frame (0 s in this example) and the time stamp of the first video frame plus the duration of the first video frame (e.g., the cue point 224 may be between 2.5 s and 2.5 s+0.033 s).

With respect to the method 200, the variable "$C_n$" may refer to a particular cue point. A cue point is a marker at a precise time point in the duration of video and/or audio content. The variable "DV" may be defined as the duration of one video frame and the variable "DA" may be defined as the duration of one audio frame. A series of video frames may form a video fragment and a series of audio frames may form an audio fragment. A presentation time stamp (PTS) variable may indicate a time at which video or audio is to be presented (e.g., the start of the video or audio frame). A presentation time duration (PTD) variable may indicate a duration of the video or audio frame that begins at the time specified by the PTS. The PTS of a video or audio frame may be a single value and the associated PTD for the video or audio frame may span from PTS to the sum of PTS and either DA or DV depending on whether the frame is an audio frame or a video frame. For example, the PTS for the first video frame of the second fragment 220 shown in FIG. 1 may be 2.5 s and the PTD may be 0.033 s given that the duration of each video frame is 33 ms.

Under CAE, the following relationship may exist between $TV_n$ and $TA_n$:

$$TV_n \leq TA_n \quad \text{(Equation 1)}$$

That is, the accumulated duration of audio segments may be larger than or equal to the accumulated duration of video segments and less than that of video segments plus one audio frame duration, at any segment boundaries, including the ones for cue points. Given the $n^{th}$ cue point timestamp, $C_n$, $C_n$ identified against video frames may satisfy:

$$PTSV_n < C_n < PTSV_n + DV \quad \text{(Equation 2)}$$

Where $PTSV_n$ is the time stamp of the last video frame in the last video segment in the $n^{th}$ period with:

$$TV_n = PTSV_n + DV \quad \text{(Equation 3)}$$

$$TA_n = PSTA_n = DA \quad \text{(Equation 4)}$$

That is, Equation 2 indicates that cue point "n" must be in between the PST of the video frame "n" and the end point of the video frame "n." It may be undesirable to use $PTSV_n = C_n$ or $C_n = PTSV_n + DV$, as this may create some ambiguity about whether the frame on belongs to the end of a certain scene (e.g., a scene in the video content) or the beginning of the scene. Thus Equation 5 shown below may remove ambiguity if a cue point is on the boundary of a frame and clarifies which side of the boundary the cue point may be located.

$$C_n\, PTSV_n + DV = TV_n \quad \text{(Equation 5)}$$

The cue point interval $C_n - C_{n-1}$ may also be compared against the accumulated segment duration for the target period for video stream, $TV_n - TV_{n-1}$. Because $C_n \leq TV_n$ and $-C_{n-1} < -PSTV_n + DV$, the following may be apply:

$$C_n - C_{n-1} \leq TV - (PTSV_{n-1} + DV) + DV = TV_n - TV_{n-1} + DV \quad \text{(Equation 6)}$$

In order to work around and eliminate the rounding issue in segment duration representation in floating point in HLS rather than time scale in DASH, which causes loss of accuracy and drifting, $C_n$ and $TV_n$ may be converted for accumulated segment duration in seconds into frame numbers by multiplying video frame rate f.

$$PTSV_n*f<(PTSV_n+DV)*f$$

$$X<C_n*f<X=1$$

Where frame X has a time stamp PTSV and frame X+1 has time stamp $PTSV_n+DV$. Given that:

$$TV_n=PSTV_n+DV$$

$$TV_n*f=(PTSV_n+DV)*f=X+1$$

The following may be used:

$$Round(C_n*f) \leq Round(TV_n*f) \quad \text{(Equation 7)}$$

Either Equation 5 or Equation 6 may be used to calculate the target video segments in the DASH period with accurate media timeline representation. Equation 7 may be to be used for discontinuity construction in HLS with rounding issue or accuracy loss in segment duration representation before the use of Equation 5 or Equation 6. This is because HLS fragments are represented as decimal numbers, which are converted back into exact frames using Equation 7. Then can use Equations in 5 and 6 for HLS.

Figure 3:
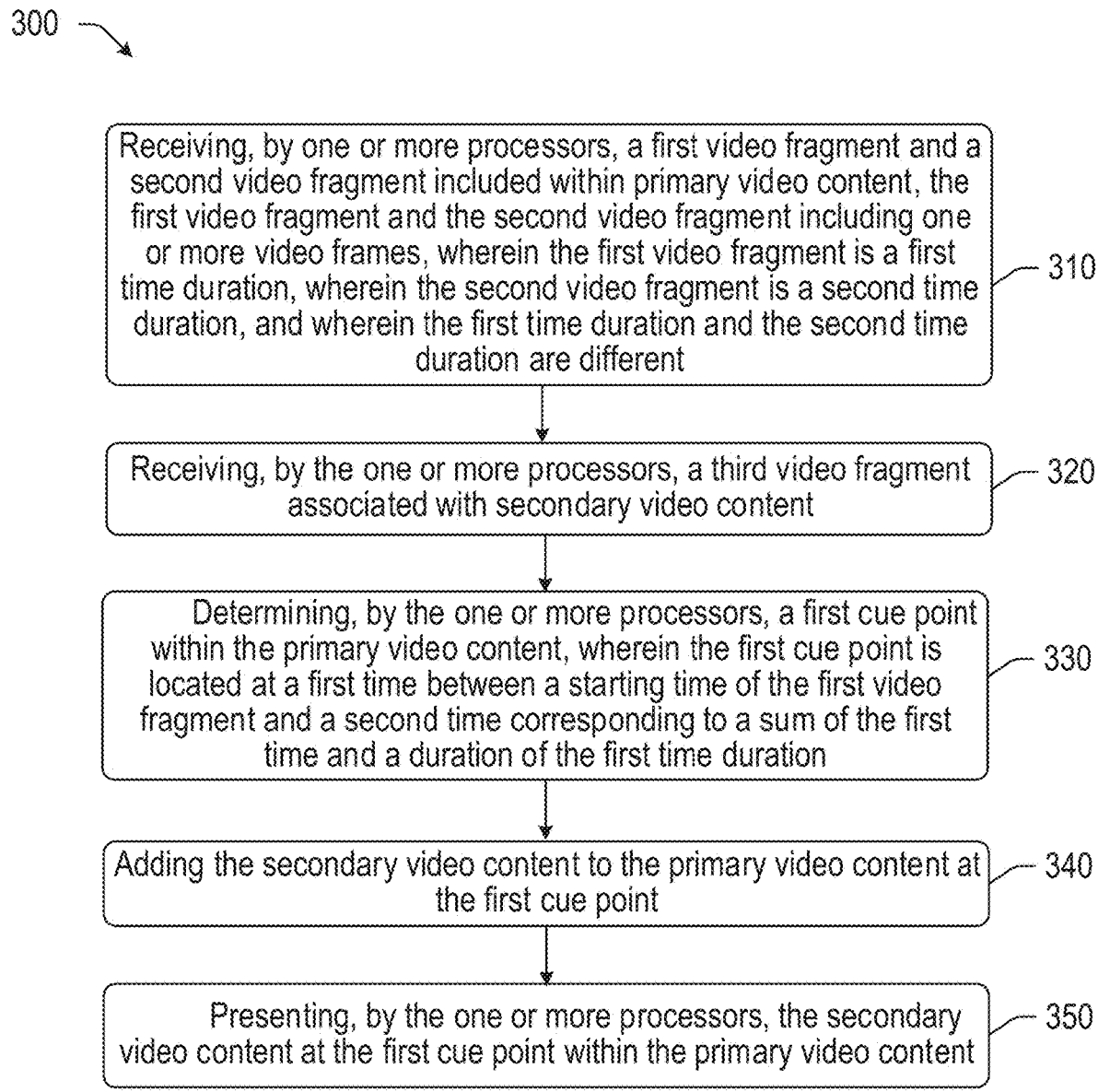
FIG. 3 depicts an example method for audio and video content stitching in accordance with one or more example embodiments of the disclosure.

FIG. 3 depicts another example method 300 for audio and video content stitching. Some or all the blocks of the process flows or methods in this disclosure may be performed in a distributed manner across any number of devices or systems (for example, user device 402, remote system 404, computing device 500, etc.). The operations of the method 300 may be optional and may be performed in a different order.

At block 310 of the method 300, computer-executable instructions stored on a memory of a system or device, may be executed to receive a first video fragment and a second video fragment included within primary video content, the first video fragment and the second video fragment including one or more video frames, wherein the first video fragment is a first time duration, wherein the second video fragment is a second time duration, and wherein the first time duration and the second time duration are different.

In embodiments, the primary video content may be content that is streamed through a content platform, for example, video content 102 shown in the use case 100. That is, the first fragment and the second fragment may be two of several video fragments that combined form streaming content, such as a television show or a movie.

A content platform may be a service that is configured to present different types of content to a user. Content publishers may provide video, audio, and/or other types of content to the content platform and users may be able to access the content platform to view the content that is published on the platform. For example, a content publisher may provide a television show to the content platform for hosting on the content platform. The viewer (the term "user" may be used interchangeably with "viewer" herein) may then access the content platform (e.g., through an application, website, etc.), select the television show, and the television show may be streamed to the user through the content platform. In embodiments, the content may be streamed to a viewer device using a streaming protocol such as dynamic adaptive streaming over HTTP (DASH) or HTTP live streaming (HLS).

At block 320 of the method 300, computer-executable instructions stored on a memory of a system or device, may be executed to determine a first cue point within the primary video content, wherein the first cue point is located at a first time between a starting time of the first video fragment and a second time corresponding to a sum of the first time and a duration of the first time duration. For example, the first cue point may be based on Equation 2. The cue point may be provided between the starting time of the video fragment and the end of the video fragment to remove ambiguity about which fragment (the previous or subsequent fragment) that the cue point belongs to.

At block 330 of the method 300, computer-executable instructions stored on a memory of a system or device, may be executed to add the secondary video content to the primary video content at the first cue point.

At block 340 of the method 300, computer-executable instructions stored on a memory of a system or device, may be executed to present, by the one or more processors, the secondary video content at the first cue point within the primary video content.

In embodiments, the secondary video content may be advertisement content that may be "stitched" into the primary video content. For example, as shown in the use case 100, the advertisement content may be stitched within the primary video content at various advertisement break times. When a viewer streams the primary video content, the advertisement content may be presented to the viewer at the advertisement break times.

Figure 4:
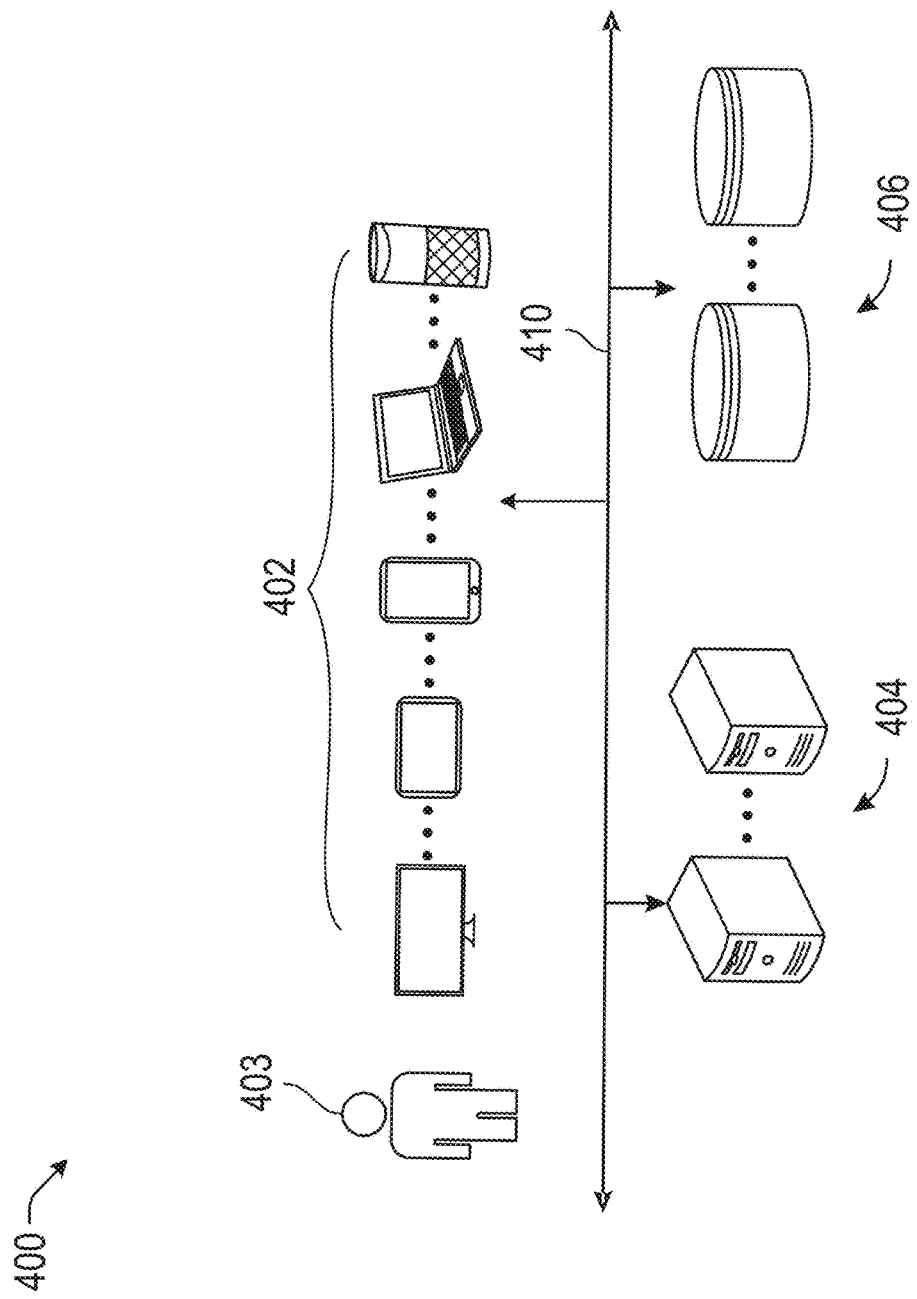
FIG. 4 depicts an example system for audio and video content stitching in accordance with one or more example embodiments of the disclosure.

FIG. 4 is an example system 400 for audio and video content stitching. In one or more embodiments, the system 400 may include one or more one or more user devices 402 that may be associated with a user 403, one or more remote computing systems 404, and/or one or more databases 406. However, these components of the system 400 are merely exemplary and are not intended to be limiting in any way. For simplicity, reference may be made hereinafter to a user device 402, remote computing system 404, etc., however, this is not intended to be limiting and may still refer to any number of such elements.

The user device 402 may be any type of device, such as a smartphone, desktop computer, laptop computer, tablet, television, and/or any other type of device. The user device 402 may be configured to stream content for the user 403 to view. For example, the user device 402 may allow the user 403 to access a content platform (for example, through an application of the user device 402, a website, etc.) to view different types of content included on the content platform. For example, the user device 402 may allow the user 403 to stream a television show, a movie, and/or any other types of content, including audio content, such as an audio book.

The remote computing system 404 (a remote server, for example) may be configured to perform any of the functionality described herein with respect to stitching secondary content into primary content (such as stitching advertisement content into streaming content presented to the user 403 through the user device 402). For example, the remote computing system 404 may perform any of the operation described with respect to FIGS. 2-3 to identify cue points within CAE content, adding the secondary content to the primary content, etc.

The database 406 may store any of the data that is used as described herein. For example, the database 406 may store any of the primary and/or secondary content associated with the content platform and/or any other types of data.

In one or more embodiments, any of the elements of the system 400 (for example, user device 402, remote system 404, database 406, etc.) may be configured to communicate via a communications network 410. The communications network 410 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 410 may have any suitable communication range associated therewith and may include, for example, global networks (e.g., the Internet), metropolitan area networks (MANs), wide area networks (WANs), local area networks (LANs), or personal area networks (PANs). In addition, communications network 410 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Finally, any of the elements (for example, user device 402, remote system 404, database 406, etc.) of the system 400 may include any of the elements of the computing device 500 as well. For example, one or more processors 502, memory devices 504, etc.

Figure 5:
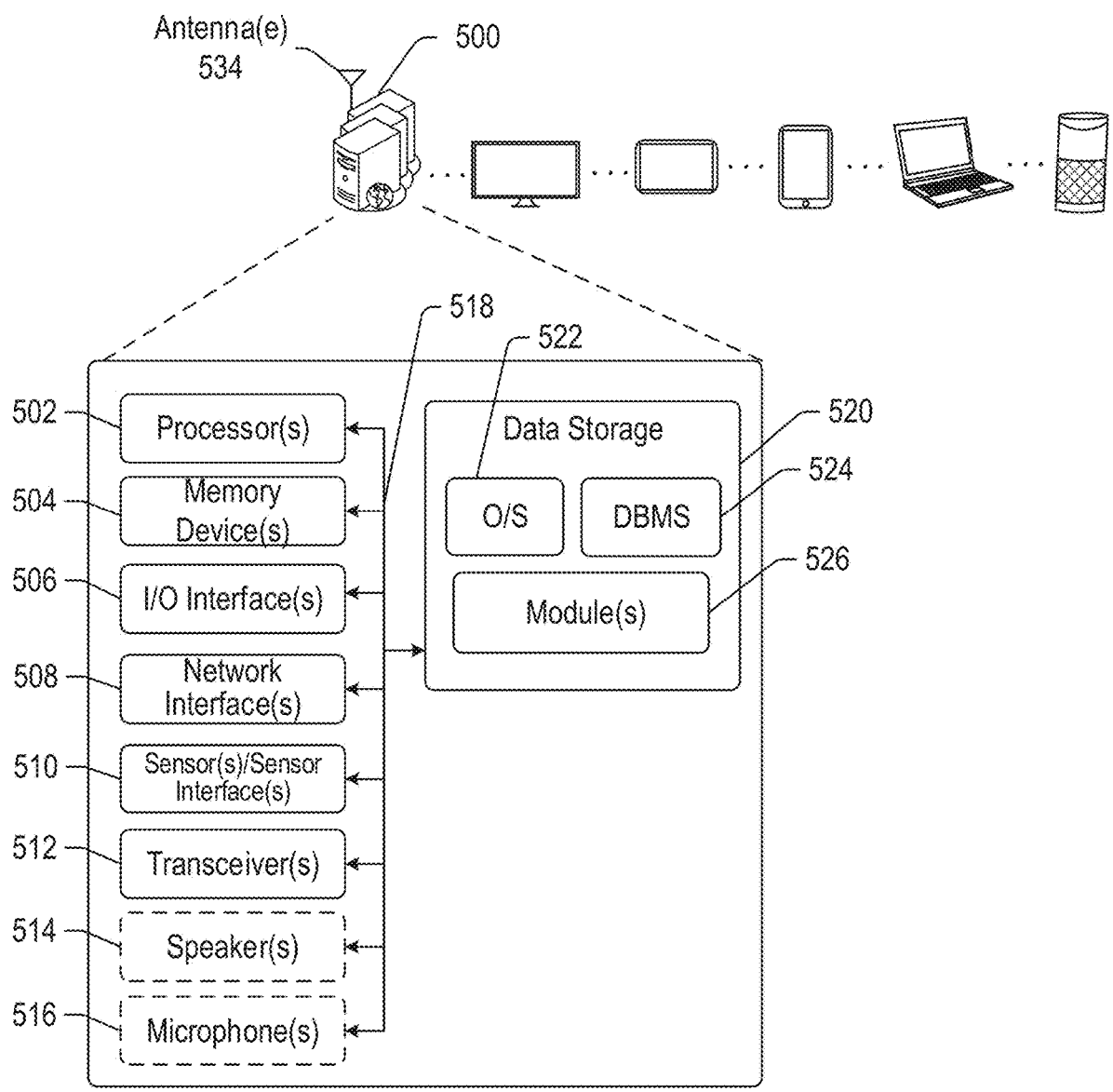
FIG. 5 depicts an example computing device in accordance with one or more example embodiments of the disclosure.

FIG. 5 is a schematic block diagram of an illustrative computing device 500 in accordance with one or more example embodiments of the disclosure. The computing device 500 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The computing device 500 may correspond to an illustrative device configuration for the devices of FIGS. 1-5 (for example, user device 402, remote system 404, database 406, etc.).

The computing device 500 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 500 may include one or more processors (processor(s)) 502, one or more memory devices 504 (generically referred to herein as memory 504), one or more input/output (I/O) interface(s) 506, one or more network interface(s) 508, one or more sensors or sensor interface(s) 510, one or more transceivers 512, one or more optional speakers 514, one or more optional microphones 516, and data storage 520. The computing device 500 may further include one or more buses 518 that functionally couple various components of the computing device 500. The computing device 500 may further include one or more antenna(e) 534 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 518 may include at least one of a system bus, a memory bus, an address bus, or a message bus, and may permit exchange of information (e.g., data (including computer-executable code), signaling, etc.) between various components of the computing device 500. The bus(es) 518 may include, without limitation, a memory bus or a memory controller, a peripheral bus, an accelerated graphics port, and so forth. The bus(es) 518 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the computing device 500 may include volatile memory (memory that maintains its state when supplied with power) such as random-access memory (RAM) and/or non volatile memory (memory that maintains its state even when not supplied with power) such as read-only memory (ROM), flash memory, ferroelectric RAM (FRAM), and so forth. Persistent data storage, as that term is used herein, may include non volatile memory. In certain example embodiments, volatile memory may enable faster read/write access than non volatile memory. However, in certain other example embodiments, certain types of non volatile memory (e.g., FRAM) may enable faster read/write access than certain types of volatile memory.

In various implementations, the memory 504 may include multiple different types of memory such as various types of static random-access memory (SRAM), various types of dynamic random-access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi level cache organized as a hierarchy of one or more cache levels (L1, L2, etc.).

The data storage 520 may include removable storage and/or non removable storage including, but not limited to, magnetic storage, optical disk storage, and/or tape storage. The data storage 520 may provide non volatile storage of computer-executable instructions and other data. The memory 504 and the data storage 520, removable and/or non removable, are examples of computer-readable storage media (CRSM) as that term is used herein.

The data storage 520 may store computer-executable code, instructions, or the like that may be loadable into the memory 504 and executable by the processor(s) 502 to cause the processor(s) 502 to perform or initiate various operations. The data storage 520 may additionally store data that may be copied to memory 504 for use by the processor(s) 502 during the execution of the computer-executable instructions. Moreover, output data generated as a result of execution of the computer-executable instructions by the processor(s) 502 may be stored initially in memory 504 and may ultimately be copied to data storage 520 for non volatile storage.

More specifically, the data storage 520 may store one or more operating systems (O/S) 522; one or more database management systems (DBMS) 524; and one or more program module(s), applications, engines, computer-executable code, scripts, or the like such as, for example, one or more module(s) 526. Some or all these module(s) may be submodule(s). Any of the components depicted as being stored in data storage 520 may include any combination of software, firmware, and/or hardware. The software and/or firmware may include computer-executable code, instructions, or the like that may be loaded into the memory 504 for execution by one or more of the processor(s) 502. Any of the components depicted as being stored in data storage 520 may support functionality described in reference to correspondingly named components earlier in this disclosure.

The data storage 520 may further store various types of data utilized by components of the computing device 500. Any data stored in the data storage 520 may be loaded into the memory 504 for use by the processor(s) 502 in executing computer-executable code. In addition, any data depicted as being stored in the data storage 520 may potentially be stored in one or more datastore(s) and may be accessed via the DBMS 524 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 5, the datastore(s) may include, for example, purchase history information, user action information, user profile information, a database linking search queries and user actions, and other information.

The processor(s) 502 may be configured to access the memory 504 and execute computer-executable instructions loaded therein. For example, the processor(s) 502 may be configured to execute computer-executable instructions of the various program module(s), applications, engines, or the like of the computing device 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 5, the module(s) 526 may include computer-executable instructions, code, or the like that responsive to execution by one or more of the processor(s) 502 may perform functions including, but not limited to determining a cue point for stitching secondary content into primary content, performing the stitching of the secondary content into the primary content, etc.

Referring now to other illustrative components depicted as being stored in the data storage 520, the O/S 522 may be loaded from the data storage 520 into the memory 504 and may provide an interface between other application software executing on the computing device 500 and hardware resources of the computing device 500. More specifically, the O/S 522 may include a set of computer-executable instructions for managing hardware resources of the computing device 500 and for providing common services to other application programs (e.g., managing memory allocation among various application programs). In certain example embodiments, the O/S 522 may control execution of the other program module(s) to dynamically enhance characters for content rendering. The O/S 522 may include any operating system now known or which may be developed in the future including, but not limited to, any server operating system, any mainframe operating system, or any other proprietary or non-proprietary operating system.

The DBMS 524 may be loaded into the memory 504 and may support functionality for accessing, retrieving, storing, and/or manipulating data stored in the memory 504 and/or data stored in the data storage 520. The DBMS 524 may use any of a variety of database models (e.g., relational model, object model, etc.) and may support any of a variety of query languages. The DBMS 524 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 500 is a mobile device, the DBMS 524 may be any suitable light-weight DBMS optimized for performance on a mobile device.

Referring now to other illustrative components of the computing device 500, the input/output (I/O) interface(s) 506 may facilitate the receipt of input information by the computing device 500 form ae or more I/O devices as well as the output of information from the computing device 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(e) 534 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 500 may further include one or more network interface(s) 508 via which the computing device 500 may communicate with any of a variety of other systems, platforms, networks, devices, and so forth. The network interface(s) 508 may enable communication, for example, with one or more wireless routers, one or more host servers, one or more web servers, and the like via one or more of networks.

The antenna(e) 534 may include any suitable type of antenna depending, for example, on the communications protocols used to transmit or receive signals via the antenna (e) 534. Non-limiting examples of suitable antennas may include directional antennas, non directional antennas, dipole antennas, folded dipole antennas, patch antennas, multiple-input multiple-output (MIMO) antennas, or the like. The antenna(e) 534 may be communicatively coupled to one or more transceivers 512 or radio components to which or from which signals may be transmitted or received.

As previously described, the antenna(e) 534 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 534 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 534 may be configured to transmit or receive radio frequency signals within any suitable frequency range forming part of the unlicensed portion of the radio spectrum.

The antenna(e) 534 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna(e) 534—transmitting or receiving radio frequency (RF) signals in the bandwidth and/or channels corresponding to the communications protocols utilized by the computing device 500 to communicate with other devices. The transceiver(s) 512 may include hardware, software, and/or firmware for modulating, transmitting, or receiving—potentially in cooperation with any of antenna(e) 534—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the computing device 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 514 may be any device configured to generate audible sound. The optional microphone(s) 516 may be any device configured to receive analog sound input or voice data.

It should be appreciated that the program module(s), applications, computer-executable instructions, code, or the like depicted in FIG. 5 as being stored in the data storage 520 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 500, and/or hosted on other computing device(s) accessible via one or more networks, may be provided to support functionality provided by the program module(s), applications, or computer-executable code depicted in FIG. 5 and/or additional or alternate functionality. Further, functionality may be modularized differently such that processing described as being supported collectively by the collection of program module(s) depicted in FIG. 5 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 5 may be implemented, at least partially, in hardware and/or firmware across any number of devices.

It should further be appreciated that the computing device 500 may include alternate and/or additional hardware, software, or firmware components beyond those described or depicted without departing from the scope of the disclosure. More particularly, it should be appreciated that software, firmware, or hardware components depicted as forming part of the computing device 500 are merely illustrative and that some components may not be present or additional components may be provided in various embodiments. While various illustrative program module(s) have been depicted and described as software module(s) stored in data storage 520, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random-access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:

encoding, by one or more processors and using a dynamic adaptive streaming over HTTP (DASH) or HTTP live streaming (HLS) protocol, primary video content for presentation via a content stream into a plurality of video fragments comprising at least a first video fragment, a second video fragment, and a third video fragment, the first video fragment including a first plurality of video frames, the second video fragment including a second plurality of video frames, and the third video fragment including a third plurality of video frames, wherein the first video fragment is a first time duration, wherein the second video fragment is a second time duration, and wherein the first time duration and the second time duration are different;

determining, by the one or more processors, that a time slot for presentation of advertisement content is between the second video fragment and the third video fragment of the primary video content;

receiving a fourth video fragment and an audio fragment associated with the advertisement video content;

determining, by the one or more processors, a first cue point within the primary video content, wherein the first cue point provides an indication of an insertion point for the advertisement content, wherein the first cue point is located at a first time between a starting time of a first video frame of the third video fragment and a second time corresponding to a sum of the first time and a duration of the first video frame of the third video fragment;

adding, by the one or more processors, the audio fragment of the advertisement content to the content stream at a first time corresponding to the first cue point, and the fourth video fragment of the advertisement content to a second time corresponding to a beginning of the first video frame of the third video fragment; and presenting, by the one or more processors, the primary video content and the advertisement content during the content stream.

2. The method of claim 1, wherein the first cue point is a non-integer numerical value, and wherein the method further comprises rounding a product of the first cue point and a video frame rate.

3. The method of claim 1, wherein a time difference between the first cue point and a prior cue point at a third time is less than or equal to a sum of a first value and a second value, the first value being a difference between a first accumulated duration of the primary video content at the first time and a second accumulated duration of the primary video content at the third time, and the second value being a video frame duration of a first video frame of the one or more video frames.

4. A method comprising:

encoding, by one or more processors, primary video content for presentation via a content stream into a plurality of video fragments comprising at least a first video fragment, a second video fragment, and a third video fragment, the first video fragment including a first plurality of video frames, the second video fragment including a second plurality of video frames, and the third video fragment including a third plurality of video frames, wherein the first video fragment is a first time duration, wherein the second video fragment is a second time duration, and wherein the first time duration and the second time duration are different;

determining, by the one or more processors, that a time slot for presentation of secondary video content is between the second video fragment and the third video fragment of the primary video content;

receiving, by the one or more processors, a fourth video fragment and an audio fragment associated with the secondary video content;

determining, by the one or more processors, a first cue point within the primary video content, wherein the first cue point provides an indication of an insertion point for the secondary video content, wherein the first cue point is located at a first time between a starting time of a first video frame of the third video fragment and a second time corresponding to a sum of the first time and a duration of first video frame of the third video fragment;

adding the fourth video fragment of the secondary video content to a second time corresponding to a beginning of the first video frame of the third video fragment; and presenting, by the one or more processors, the primary video content and the secondary video content during the content stream.

5. The method of claim 4, wherein the secondary video content is advertisement content.

6. The method of claim 4, wherein an accumulated duration of the secondary video content is always less than or equal to the accumulated duration of secondary audio content associated with the secondary video content.

7. The method of claim 4, wherein the first cue point is a non-integer numerical value, and wherein the method further comprises rounding a product of the first cue point and a video frame rate.

8. The method of claim 4, wherein a time difference between the first cue point and a prior cue point at a third time is less than or equal to a sum of a first value and a second value, the first value being a difference between a first accumulated duration of the primary video content at the first time and a second accumulated duration of the primary video content at the third time, and the second value being a video frame duration of a first video frame of the one or more video frames.

9. The method of claim 4, wherein adding the secondary video content to the primary video content further comprises modifying a location of the first cue point to a third time located at a boundary of the first video fragment.

10. The method of claim 4, wherein the primary video content and secondary content are encoded using a dynamic adaptive streaming over HTTP (DASH) or HTTP live streaming (HLS) protocol.

11. The method of claim 4, further comprising:

adding the audio fragment of the secondary video content to the content stream at a first time corresponding to the first cue point.

12. A system comprising:

memory that stores computer-executable instructions; and
one or more processors configured to access the memory and execute the computer-executable instructions to:

encode primary video content for presentation via a content stream into a plurality of video fragments comprising at least a first video fragment, a second video fragment, and a third video fragment, the first video fragment including a first plurality of video frames, the second video fragment including a second plurality of video frames, and the third video fragment including a third plurality of video frames, wherein the first video fragment is a first time duration, wherein the second video fragment is a second time duration, and wherein the first time duration and the second time duration are different;

determine that a time slot for presentation of secondary video content is between the second video fragment and the third video fragment of the primary video content;

receive a fourth video fragment and an audio fragment associated with the secondary video content;

determine a first cue point within the primary video content, wherein the first cue point provides an indication of an insertion point for the secondary video content, wherein the first cue point is located at a first time between a starting time of a first video frame of the third video fragment and a second time corresponding to a sum of the first time and a duration of first video frame of the third video fragment;

add the fourth video fragment of the secondary video content to a second time corresponding to a beginning of the first video frame of the third video fragment; and present, by the one or more processors, the primary video content and the secondary video content during the content stream.

13. The system of claim 12, wherein the secondary video content is advertisement content.

14. The system of claim 12, wherein an accumulated duration of the secondary video content is always less than or equal to the accumulated duration of secondary audio content associated with the secondary video content.

15. The system of claim 12, wherein the first cue point is a non-integer numerical value, and wherein the one or more processors are further configured to and execute the computer-executable instructions to round a product of the first cue point and a video frame rate.

16. The system of claim 12, wherein a time difference between the first cue point and a prior cue point at a third time is less than or equal to a sum of a first value and a second value, the first value being a difference between a first accumulated duration of the primary video content at the first time and a second accumulated duration of the primary video content at the third time, and the second value being a video frame duration of a first video frame of the one or more video frames.

17. The system of claim 12, wherein the primary video content and secondary content are encoded using a dynamic adaptive streaming over HTTP (DASH) or HTTP live streaming (HLS) protocol.

* * * * *